United States Patent [19]
Himeda et al.

[11] Patent Number: 6,025,687
[45] Date of Patent: Feb. 15, 2000

[54] MOBILE UNIT AND CONTROLLER FOR MOBILE UNIT

[75] Inventors: Satoshi Himeda, Amagasaki; Akira Nukuzuma, Kyoto, both of Japan

[73] Assignee: Minolta Co., Ltd., Osaka, Japan

[21] Appl. No.: 09/159,690

[22] Filed: Sep. 24, 1998

[30] Foreign Application Priority Data

Sep. 26, 1997 [JP] Japan ................................. 9-262194

[51] Int. Cl.$^7$ ................................................. G05D 1/02
[52] U.S. Cl. ........................................... 318/586; 318/587
[58] Field of Search .............................. 318/567, 568.1, 318/568.11, 568.12, 586, 587; 364/423.098, 423.099, 424.026, 424.027, 424.051

[56] References Cited

U.S. PATENT DOCUMENTS

| | | | |
|---|---|---|---|
| 5,001,637 | 3/1991 | Shiraishi et al. | 364/424.051 |
| 5,136,507 | 8/1992 | Shiraishi et al. | 364/424.051 |
| 5,479,079 | 12/1995 | Jeong et al. | 318/568.12 |
| 5,642,106 | 6/1997 | Hancock et al. . | |
| 5,765,118 | 6/1998 | Fukatani | 701/72 |

FOREIGN PATENT DOCUMENTS

| | | |
|---|---|---|
| 07184411 | 7/1995 | Japan . |
| 09037610 | 2/1997 | Japan . |
| 09133539 | 5/1997 | Japan . |
| 10039927 | 2/1998 | Japan . |

*Primary Examiner*—Bentsu Ro
*Attorney, Agent, or Firm*—McDermott, Will & Emery

[57] ABSTRACT

A controller for a mobile unit providing a setting unit to set an upper limit on the number of corrective rotations of to turn said mobile unit so as to correct the turning angle of said mobile unit, and a turning unit to turn said mobile unit within a range of a set number of corrective rotations to correct the turning angle after said mobile unit has turned.

12 Claims, 10 Drawing Sheets

| fluid parameter | Nmax |
|---|---|
| polish | 2 |
| disinfectant | 3 |
| wax | 4 |

FIG. 9

| floor condition parameter | | Nmax |
|---|---|---|
| floor material | inclination | |
| wood | no | 2 |
| wood | yes | 3 |
| vinylchloride | no | 4 |
| vinylchloride | yes | 5 |
| glass | no | 6 |
| glass | yes | 7 |

FIG. 11

| running accuracy parameter | Nmax |
|---|---|
| 5mm | 4 |
| 10mm | 2 |

L: straight advancing distance
r: turning 90°
p: pitch

MOBILE UNIT AND CONTROLLER FOR MOBILE UNIT

RELATED APPLICATIONS

This application is based on Application No. HEI 9-262194 filed in Japan, the content of which is hereby incorporated by reference.

BACKGROUND OF THE INVENTION

1. Field of the Invention

The present invention relates to a mobile unit and a controller for a mobile unit, and specifically relates to a controller for correction control to accurately turn a self-controlled mobile unit.

2. Description of the Related Art

Figure 13:
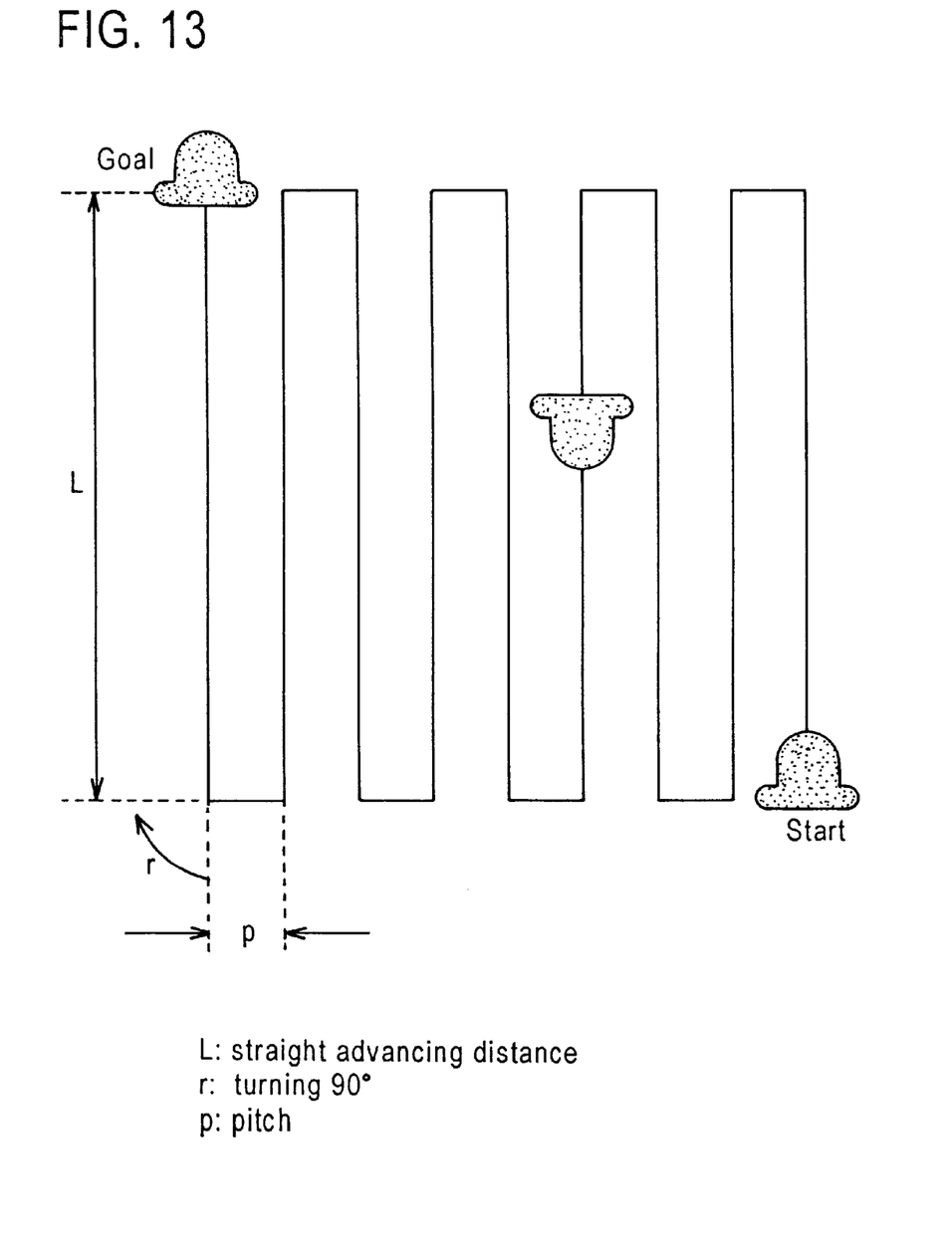
FIG. 13 shows an example of a robot operating pattern.

Robots (a type of mobile unit) which move within a defined region to accomplish work have been known for sometime. Such a robot works in predetermined wide and travels in the zigzag pattern shown in FIG. 13 to accomplish work completely within a region. In this zigzag pattern, the robot repeats a process of advancing a distance L, turning 90°, and advancing pitch p, and turning 90° from a starting point to a goal.

In order to accurately pursue this zigzag pattern, the robot must accurately turn 90°. When driving the wheels and measuring the amount of rotation of the wheels of the robot via an encoder, some slippage occurs between the wheels and the floor, such that the robot cannot turn with accuracy. Installing a gyroscopic sensor in a robot has been considered to measure the actual turning angle of the robot and correct the shifting (error) of the turning angle caused by slippage of the wheels. Typically, when the detection result of a gyroscopic sensor is fed back to accomplish correction in real time, turning cannot be accomplished rapidly due to the time required for detection by the gyroscopic sensor. Therefore, if the shifting of the turning angle is determined by a gyroscopic sensor after a predetermined rotation and controls are repeated to accomplish turning in accordance with said shifting, turning can be rapidly accomplished without requiring typical detection by the gyroscopic sensor.

The disadvantages described below arise when turning is corrected based on the detection result of a gyroscopic sensor.

1. First Disadvantage

Time is required to accomplish the aforesaid angle correction in the above-mentioned control method. For example, when the target turning angle is 90°, the robot continues reciprocal movement forward and back at the target turning angle (e.g., between 89° and 91°), in one type of oscillation state.

2. Second Disadvantage

Although slippage does not readily occur between the wheels and the floor when, for example, the floor is dry, slippage easily occurs when the floor is waxed. Since conventional correction methods are standardized, it has not been possible to achieve suitable correction in accordance with a given condition, such that correction is inadequate with regards to precision and work time.

SUMMARY OF THE INVENTION

An object of the present invention is to provide a controller for a mobile unit capable of rapidly and is accurately correcting the turning angle of said mobile unit.

The controller for a mobile unit of the present invention attains the aforesaid objects by providing a setting unit to set an upper limit on the number of corrective rotations of to turn said mobile unit so as to correct the turning angle of said mobile unit, and a turning unit to turn said mobile unit within a range of a set number of corrective rotations to correct the turning angle after said mobile unit has turned.

More desirably, the controller of a mobile unit is provided with a gyroscopic sensor to detect the number of turns of said mobile unit, and said turning unit measures the turning angle error based on the turning angle detected by said gyroscopic sensor.

Still more desirably, the setting unit of the controller of a mobile unit sets the upper limit of the number of corrective turns based on environmental parameters.

According to the present invention, a mobile unit is turned within a range of a set number of corrective rotations to correct the turning angle. By this means, the turning angle of the mobile unit can be rapidly and accurately corrected.

Furthermore, when the number of corrective rotations of the mobile unit is set based on environmental parameters, a suitable turning correction can be accomplished pursuant to environmental conditions.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

First Embodiment

Figure 1:
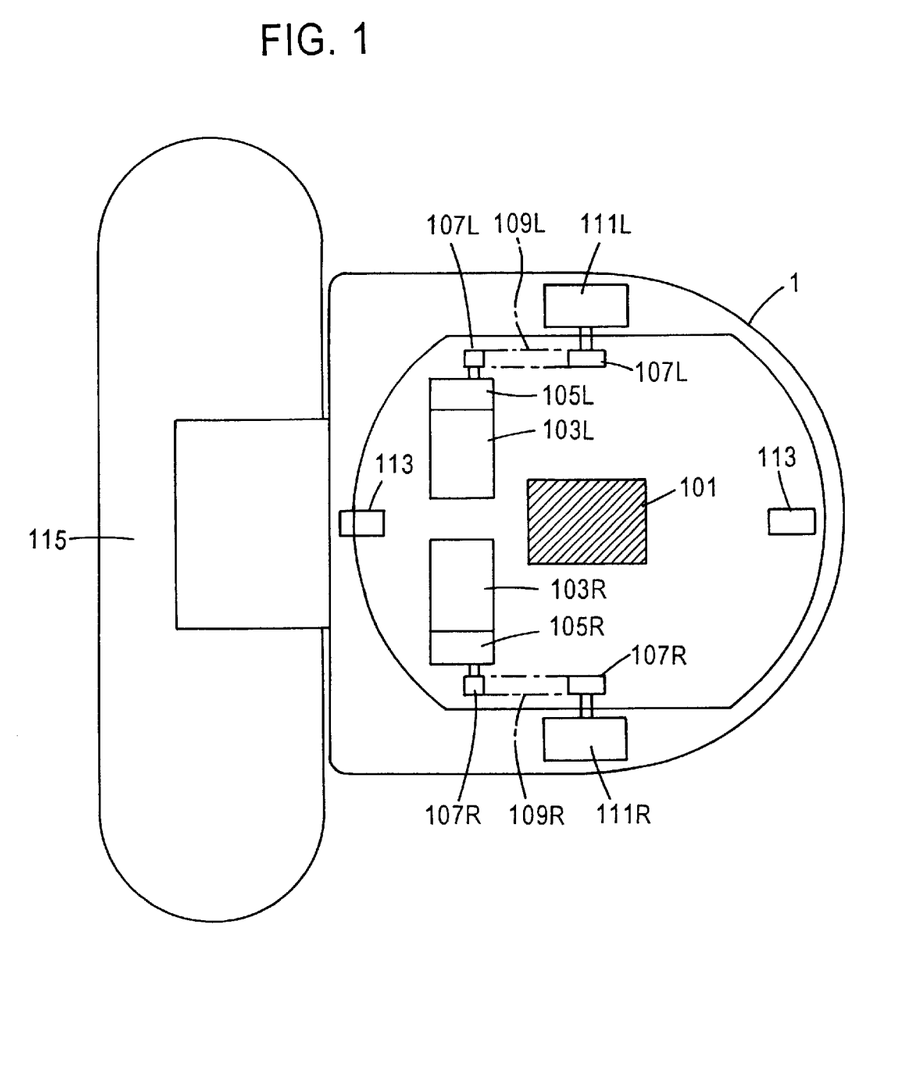
FIG. 1 is a top view of a robot in a first embodiment of the present invention.
Figure 2:
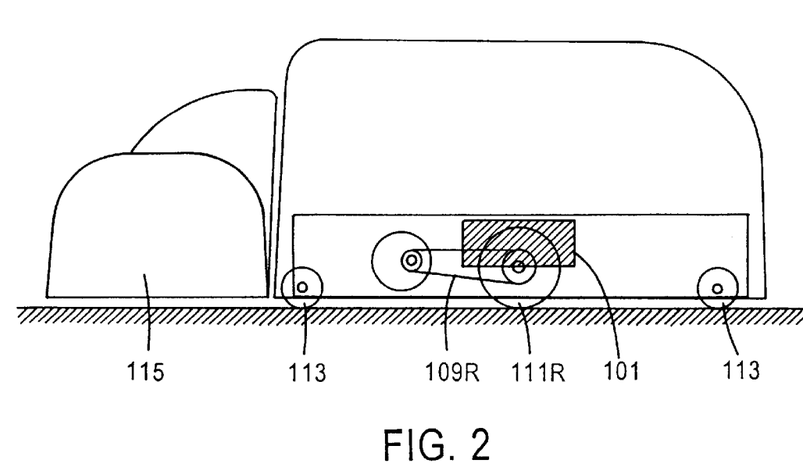
FIG. 2 is a side view of the robot of FIG. 1.

FIG. 1 is a top view of the construction of a robot of a first embodiment of the present invention. FIG. 2 is a side view of the robot of FIG. 1.

This robot is provided with a body 1, and a work unit 115 applying wax, applying disinfectant, and polishing of the floor supporting said body 1. Body 1 accommodates a gyroscope 101 for measuring the actual turning angle of the robot relative to the floor, motors 103R and 103L for driving the left and right wheels, encoders 105R and 105L for detecting the number of rotations of said motors, pulleys 107R and 107L for transmitting the drive force of said motors, belts 109R and 109L looped between said pulleys, wheels 111R and 111L for moving the body 1 via rotation while in contact with the floor, and idle wheel 113 for supporting part of the weight of the robot and which is freely rotatable.

Wheels 111R and 111L rotate together in the same direction to move the robot forward and backward, and wheels rotate in mutually opposite directions to turn the robot by pivoting about gyroscope 101.

Figure 3:
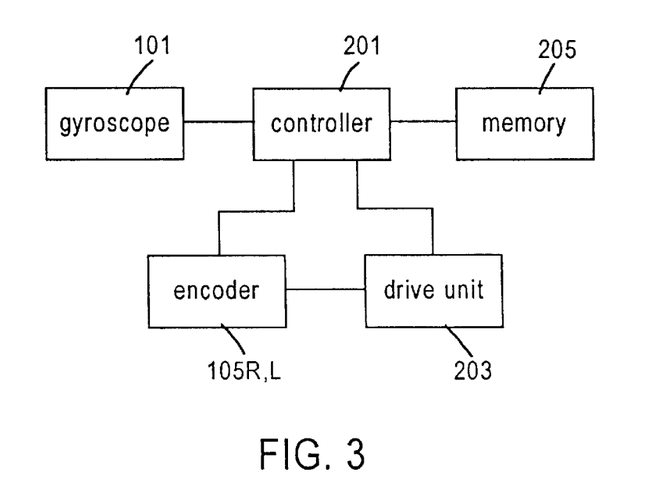
FIG. 3 is a block diagram of the control circuit of the robot of FIG. 1.

FIG. 3 is a block diagram showing the construction of the control circuit of the robot of FIG. 1.

This control circuit comprises a controller 201 in the form of a central processing unit (CPU) or the like, drive unit 203 in the form of the aforesaid wheels 103R and 103L and the like, memory 205 for storing programs and constants and the like, as well as the aforementioned gyroscope 101 and encoders 105R and 105L.

Turning at the robot target angle about gyroscope 101 is accomplished as described below. The motors 103R and 103L are rotated in mutually opposite directions via the controller 201 and drive unit 203. Then, the turn through the target angle is determined by measuring the number of rotations of motors 103R and 103L via encoders 105R and 105L. After the turn through the target angle ends, the actual turning angle of the robot is measured by gyroscope 101. When there is a difference between the target angle and measured angle, corrective rotation is executed to correct the error. This corrective rotation is accomplished by turning the robot only through an angle equal to the error based on the detection of encoders 105R and 105L. After corrective rotation, the angle of the robot is measured by gyroscope 101, and corrective rotation is performed again if there is still and error between the target angle and measured angle.

In this way encoders 105R and 105L and gyroscope 101 are used in turning the robot. There are two reasons for using both gyroscope 101 and encoders 105R and 105L; these reasons are discussed below.

(1) Encoders can detect angular data in real time. On the other hand, the correct turning angle cannot be detected when the friction coefficient between the wheel and the floor is too low, or when the wheels slip when turning the robot due to various reasons such as the presence of an obstacle.

(2) Gyroscopes can detect the correct turning angle even when the wheels slip during when the robot is turning. On the other hand, the gyroscope cannot be used for drive control of the robot in real time due to the slow sampling frequency and response speed.

Figure 4:
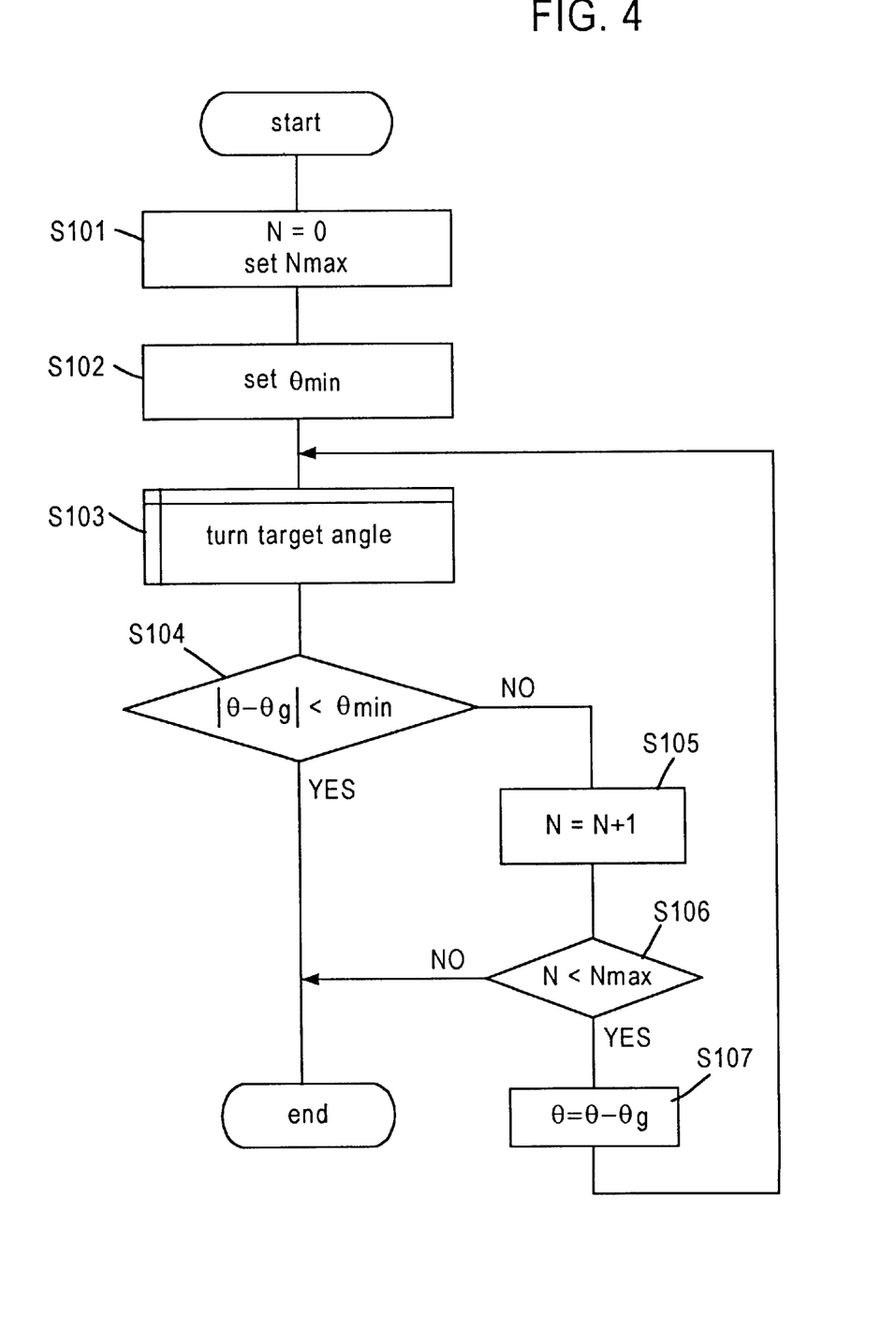
FIG. 4 is a flow chart showing the turning control of the robot of the first embodiment.

FIG. 4 is a flow chart of the process for turning the robot of the present embodiment.

First, zero [0] is substituted for the number of rotations N necessary to accomplish corrective rotation in step S101. Then, the maximum number of corrective rotations Nmax is set at, for example, 5 rotations. The maximum number of corrective rotations Nmax is the upper limit value of the number of rotations executed consecutively to accomplish corrective rotation.

The slip detection threshold value is set at The slip detection threshold value is set at θmin in step S102. This value represents the angular error allowed in turning the robot.

In step S103, the rotation of the target angle θ is set for motors 103R and 103L. At this time, turning is accomplished based on the detection of encoders 105R and 105L. After this turning ends, the angle θg actually turned by the robot is measured via gyroscope 101 in step S104. Then, the turning process ends if the absolute value |θ−θg| is less than the value θmin (Sl04: YES).

On the other hand, when the reply to the query of step S104 is NO (S104: NO), the value of the number of corrective rotations N is incremented by [1] in step S105. A determination is made in step S106 as to whether or not N<Nmax; if the determination is YES, the value θ−θg is substituted for the value θ, and the process is repeated from step S103.

If the reply to the query of step S106 is NO, however, the turning process ends.

In the present embodiment, when the number of corrective rotations N executed for corrective rotation attains the maximum number of corrective rotations Nmax, the corrective rotation ends even if error remains between the target angle and the actual turning angle. In this way the correction operation is prevented from endless repetition when the aforesaid two value do not converge. In the present embodiment, the value of Nmax may be set in accordance with the desires of the user of the robot, or may be set at a constant value previously stored in the memory of the robot.

Although the robot heretofore has been described in terms of the turning operation, the advancing operation, which is not subject to error, is accomplished by driving both wheels 111R and 111L in the same direction based on the detection of encoders 105R and 105L. When a movement error occurs in the advancing operation the gyroscope 101 may measure the angle θg actually turned by the robot after moving a predetermined amount, then correcting the direction of travel and amount of travel.

Second Through Fifth Embodiments

The hardware structure of the robots of the first through fifth embodiments is identical to that of the robot of the first embodiment and, therefore, further discussion is omitted.

The robots of the second through fifth embodiments use values of the maximum corrective rotations Nmax, i.e., the upper limit of the number of corrective rotations, which change in accordance with environmental parameters. These environmental parameters represent the environment in which the robot operates. A liquid parameter is used as the environmental parameter in the second embodiment, the floor condition is used as a parameter in the third embodiment, and movement accuracy is used as a parameter in the fourth embodiment. A plurality of these parameters are used as the environmental parameters in the fifth embodiment.

In this way it is possible to control the turning of the robot by setting the value of the maximum number of corrective rotations Nmax using environmental parameters. These parameters are used simply by way of example; other parameters may be used, e.g., air temperature, humidity, airflow and the like.

Figure 5:
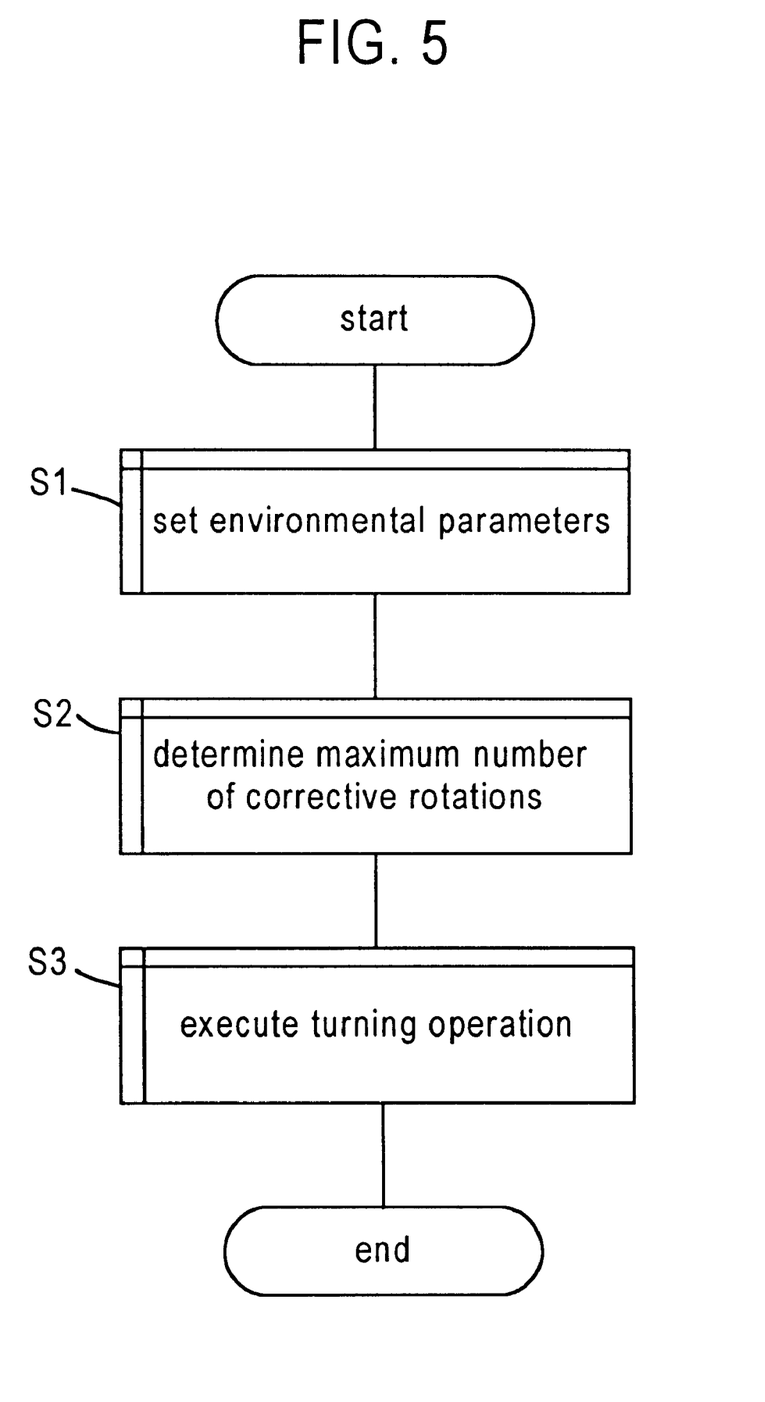
FIG. 5 is a flow chart illustrating the processes of the second through fifth embodiments.

FIG. 5 is a flow chart summarizing the robot turning process in the second through fifth embodiments.

Referring to the drawing, the environmental parameter is set in step S1. This step is accomplished by detecting the environment via sensors or input from a user. In step S2, the maximum number of corrective rotations Nmax is determined based on the environmental parameters. This determination may be made using a table stored in memory 205, or via mathematical equations or the like.

In step S3, the turning of the robot is controlled using gyroscope 101 and encoders 105R and 105L by means of the determined maximum number of corrective rotations Nmax.

Second Embodiment

Figure 6:
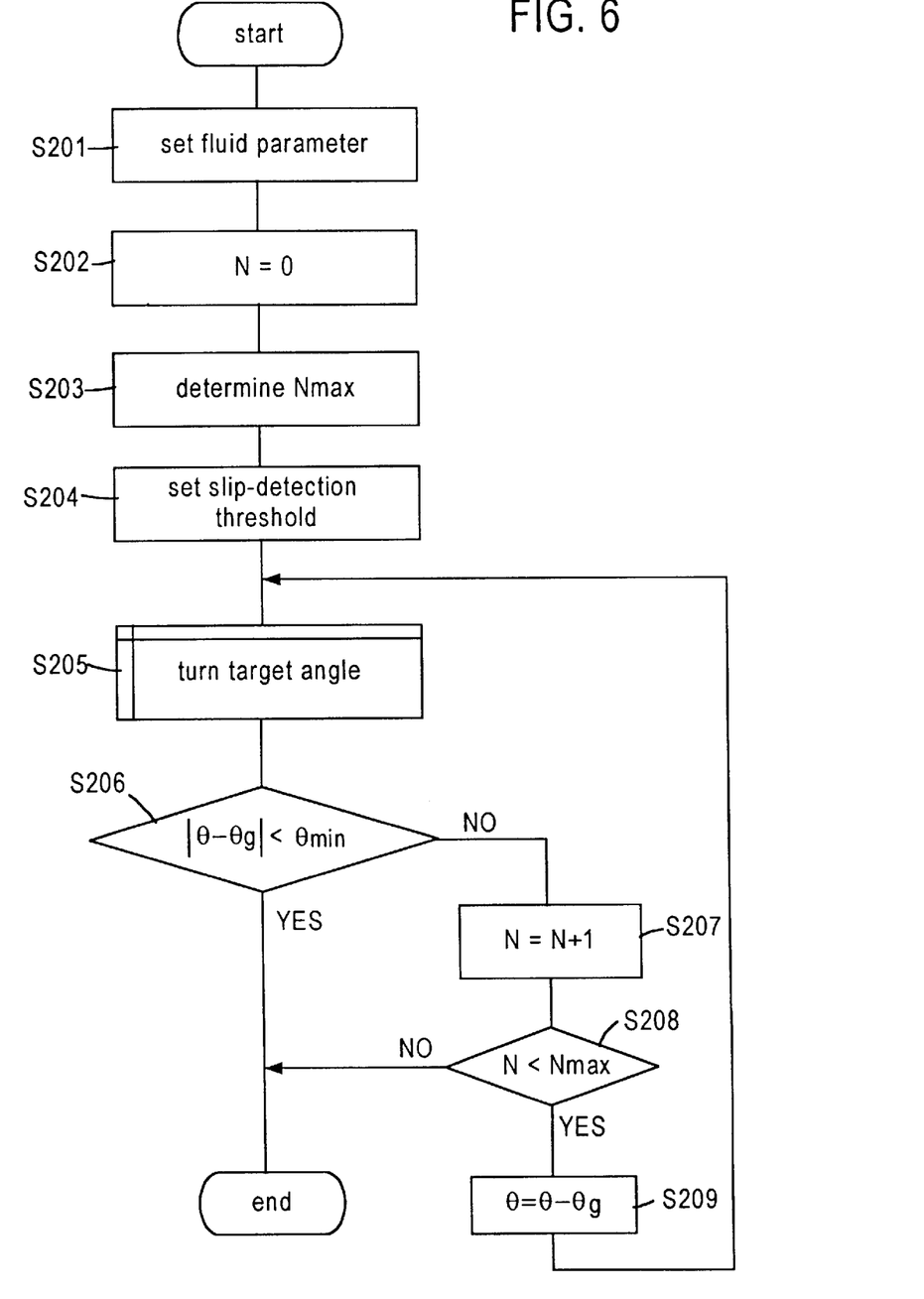
FIG. 6 is a flow chart of the turning control of the robot of a second embodiment.

FIG. 6 is a flow chart showing the robot turning process of the second embodiment. Referring to the drawing, in step S201, the fluid parameter of the fluid used by the working unit is set as the environmental parameter. For example, "polish," "disinfectant," or "wax" may be set as the fluid parameter.

Then, in step S202, zero [0] is substituted for the number of corrective rotations N. In step S203, the maximum number of corrective rotations Nmax is determined based on the fluid parameter. This determination is accomplished using the table shown in FIG. 7. This table is stored in memory 205 provided in the robot.

Figure 7:
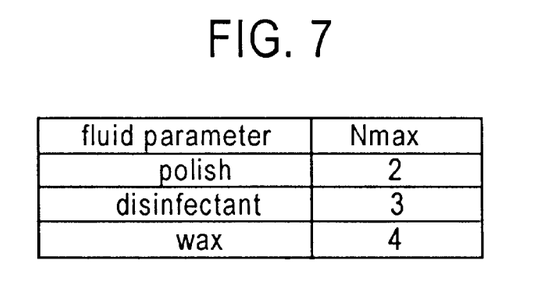
FIG. 7 shows a table of fluid parameters and maximum number of corrective turns.

Referring to FIG. 7, a value of [2] is set as the maximum number of corrective rotations for polish, a value of [3] is set as the maximum number of corrective rotations for disinfectant, and a value of [4] is set as the maximum number of corrective rotations for wax. The possibility of slippage between the wheels and the floor increases in the sequence polish>disinfectant>wax, thereby requiring larger numbers of corrective rotations in said sequence. Furthermore, compared to the application of disinfectant, the application of wax demands accurate turning to avoid residual wax.

The process in steps S205~S209 in FIG. 6 correspond to steps S103~S2107 in FIG. 4, and are therefore not discussed further.

Third Embodiment

Figure 8:
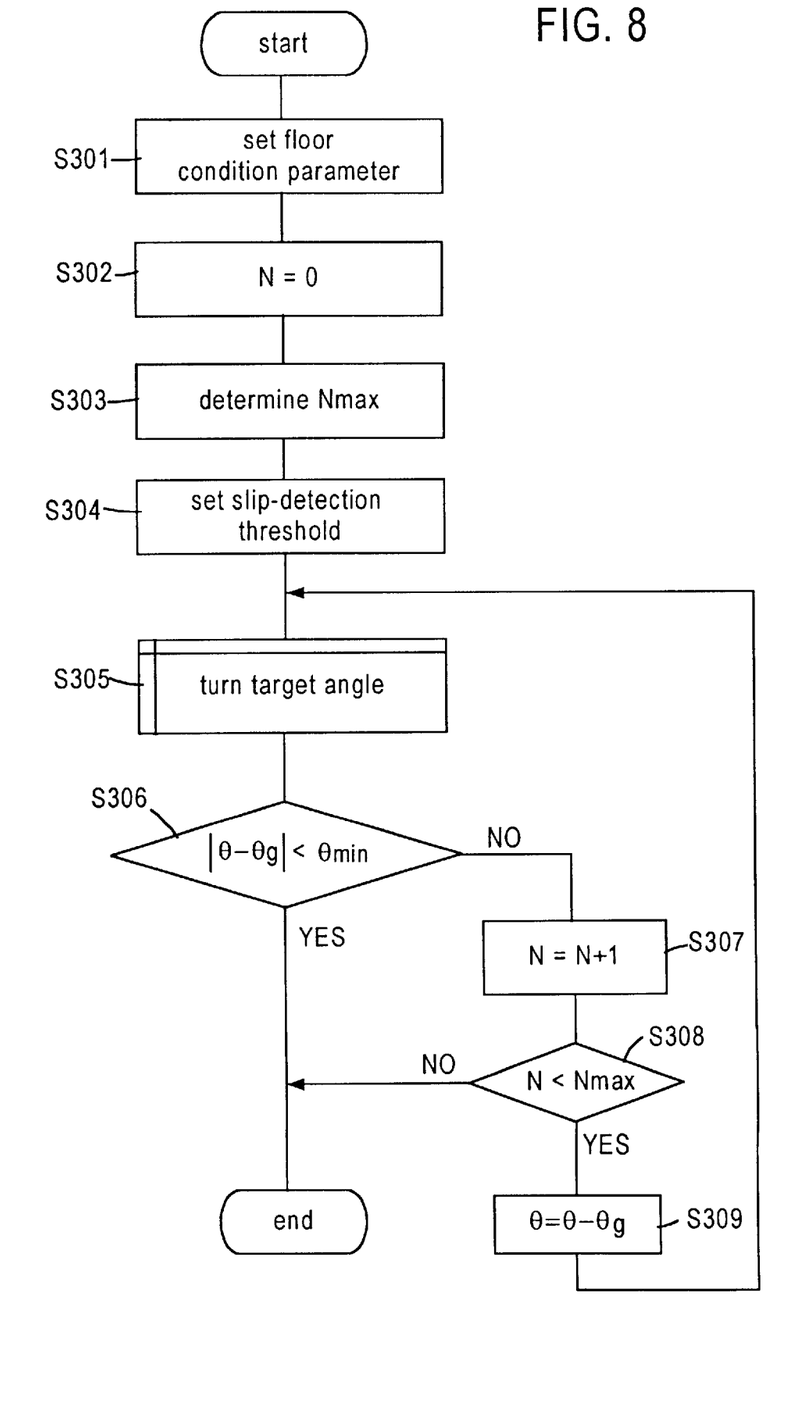
FIG. 8 is a flow chart of the turning control of a robot of a third embodiment.

FIG. 8 is a flow chart of the robot turning process of the third embodiment.

In this embodiment, the floor condition is set as the environmental parameter in step S301, and the maximum number of corrective rotations Nmax is determined based on said floor condition parameter. Other steps of this process are identical to those shown in FIG. 6.

Figure 9:
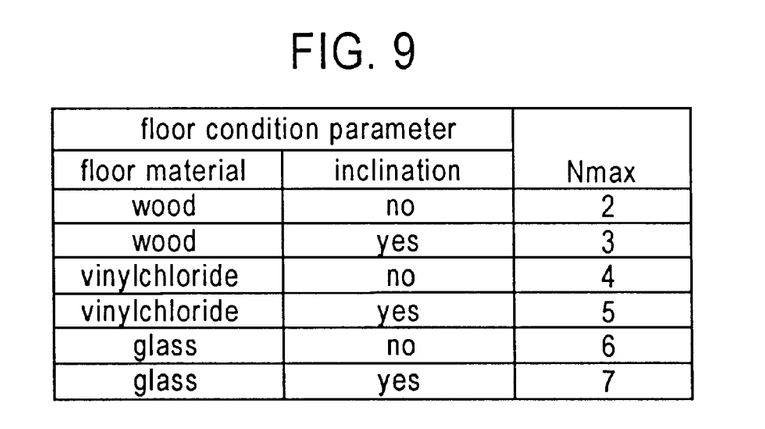
FIG. 9 shows a table of the floor condition parameters and maximum number of corrective turns.

Referring to FIG. 9, the floor condition parameter comprises floor material and inclination. The maximum number of corrective rotations Nmax for each of the respective floor condition parameters are stored in memory in the form of a table. That is, when the floor is made of wood, the value of Nmax is set at [2] for no inclination of the floor surface. When the floor is made of wood the value Nmax is set at [3] for inclination of the floor surface. When the floor is made of vinylchloride, the value Nmax is set at [4] for no inclination of the floor surface. When the floor is made of vinylchloride, the value Nmax is set at [5] for inclination of the floor surface. When the floor is made of glass, the value Nmax is set at [6] for no inclination of the floor surface. When the floor is made of glass, the value Nmax is set at [7] for inclination of the floor surface.

In this way a higher maximum number of corrective rotations are used when there is a high possibility of slippage between the wheels and the floor surface as on a slippery surface or an inclined surface due to the likelihood that accurate rotation cannot be achieved.

Fourth Embodiment

Figure 10:
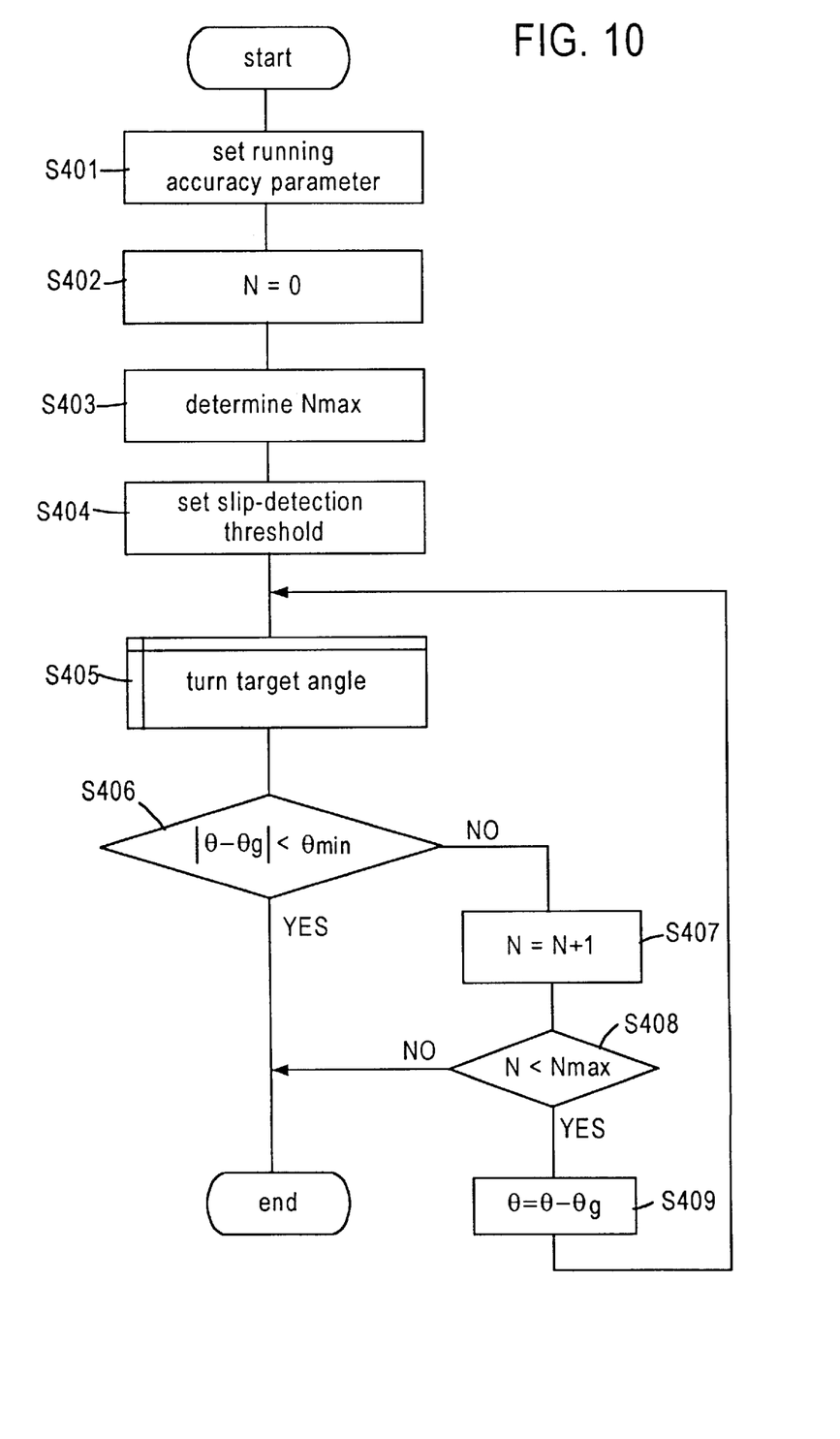
FIG. 10 is a flow chart of the turning control of a robot of a fourth embodiment.

FIG. 10 is a flow chart showing the robot turning process of the fourth embodiment.

In the present embodiment, running accuracy s set as the environmental parameter in step S401, and the maximum number of corrective rotations Nmax is set based on the running accuracy parameter instep S403. Other steps of the process are identical to those of FIG. 6.

Figure 11:
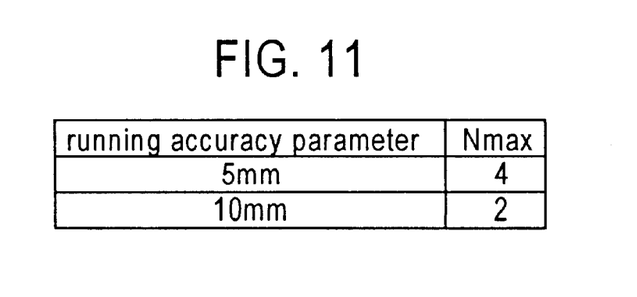
FIG. 11 shows a table of running accuracy parameters and maximum number of corrective turns.

Referring to FIG. 11, the running accuracy parameter relates to the precision required for running the robot. That is, when a running accuracy of ±5 mm is required (e.g., when applying wax or the like), the value [4] is substituted for the maximum number of corrective rotations Nmax. In contrast, a value of [2] is substituted for the maximum number of corrective rotations Nmax when a running accuracy of ±10 mm is required (e.g., when applying disinfectant or the like).

When a high running accuracy is required, the maximum number of corrective rotations increases, whereas the maximum number of corrective rotations decreases when a lower running accuracy is required. In this way the robot can be accurately turned when high accuracy is required, and the turning process can be rapidly accomplished when only low accuracy is required.

Fifth Embodiment

Figure 12:
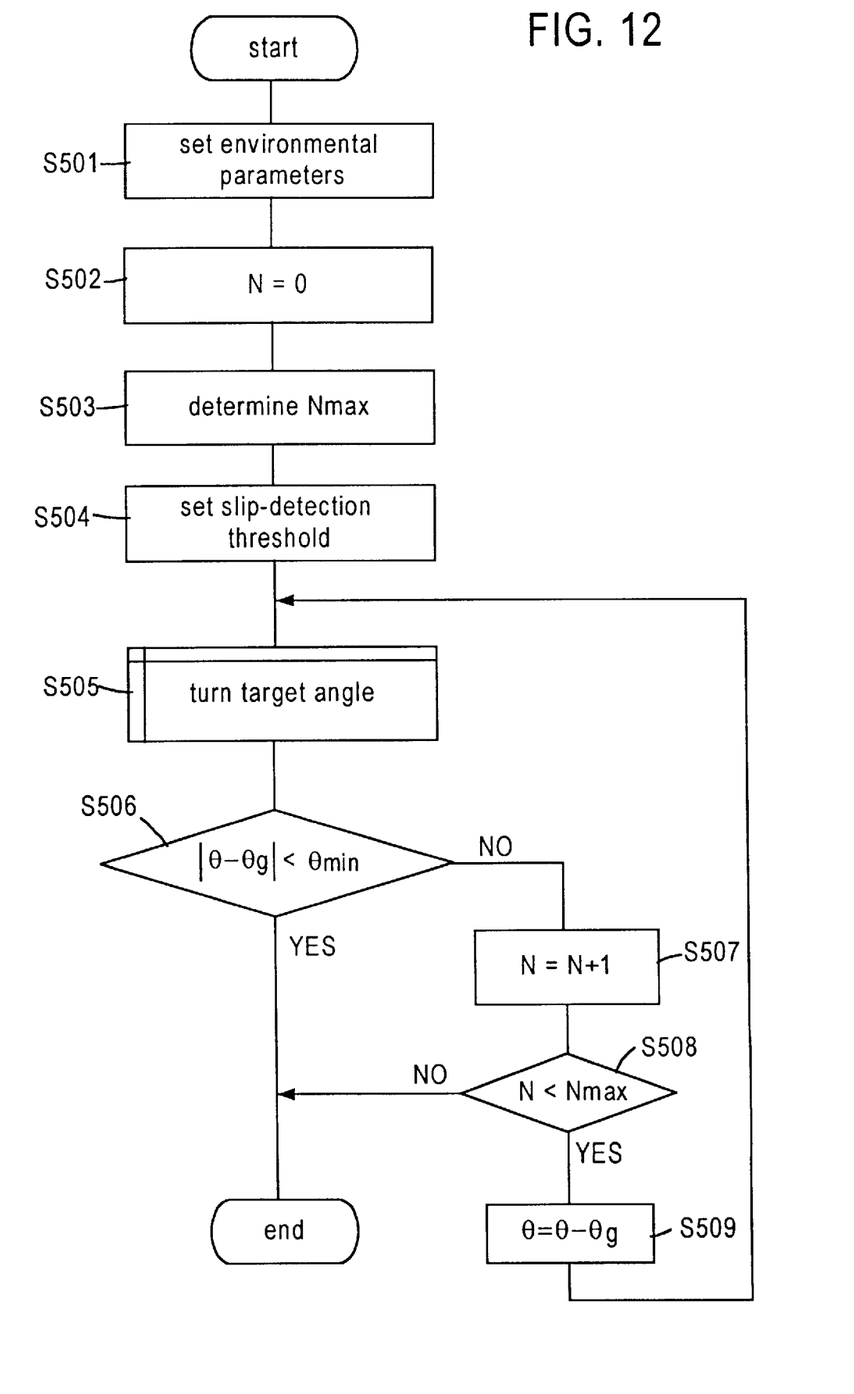
FIG. 12 is a flow chart of turning control of a robot of a fifth embodiment.

FIG. 12 is a flow chart of the robot turning process of the fifth embodiment.

In this embodiment, an environmental parameter comprising a plurality of parameters is set in step S501, and the maximum number of corrective rotations is determined based on the set environmental parameter in step S503. Other steps of the process are identical to those of FIG. 6. The plurality of parameters used in the aforesaid second through fourth embodiments are combined and used as the environmental parameter. For example, when the fluid parameter and floor surface parameter are used together, a maximum number of corrective rotations for each are added and used as the maximum number of corrective rotations in the present embodiment. Of course, the maximum number of corrective rotations may not only be calculated by simple addition, but also by weighting through addition and subtraction, as well as using the largest maximum number of corrective rotations among the respective parameters.

The maximum number of corrective rotations Nmax is not limited to the aforesaid parameters, inasmuch as a user may suitably increase or decrease the value in conjunction with operation time, operation accuracy and the like.

There are occasions when a target angle and the actual turning angle of the robot will not match even when using the previously described robot turning controls. It is believed these occasions arise when the setting of the maximum number of corrective rotations does not correspond to the actual operating environment.

In this instance, the maximum number of corrective rotations may be increase to achieve a match between the target angle and actual turning angle of the robot. That is, when a large error occurs even though a specific maximum number of corrective rotations has been set and corrective turning executed, the robot can be operated in accordance with the environment if the maximum number of corrective rotations is increased since the preset maximum number of corrective rotations is erroneous because the set environmental parameter differs from the actual environment.

Although motors 103R and 103L are driven while the rotation is detected by encoders 105R and 105L and such rotational drive has the possibility of generating error in the present embodiment, a stepping motor may be used and detection by the encoders eliminated so as to control the amount of rotation by the number of pulses supplied to the motor.

Furthermore, a terrestrial magnetic sensor may be substituted for the gyroscope 101. A gyroscope is advantageous in that the rotational angle can be accurately measured, and it is compact and suitable for self-propelled mobile units. A voltage oscillation type gyroscope is also advantageous from the perspective of compactness of the device.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A mobile apparatus comprising:
   a drive mechanism having a moving member for moving said mobile apparatus;
   a detector for detecting a position of said mobile apparatus;
   a setting means to set an upper limit on the number of corrective movement to move said mobile apparatus; and
   a controller for making said drive mechanism to corrective move within a range of said upper limit while said detecting position is not a target position.

2. An apparatus according to claim 1, wherein said detector has a gyroscopic sensor.

3. An apparatus according to claim 2, wherein said drive mechanism turns said mobile apparatus and said detector measures the turning angle error based on a signal detected by said gyroscopic sensor.

4. An apparatus according to claim 3, wherein said setting means sets the upper limit based on environmental parameters.

5. An apparatus according to claim 1, wherein said setting means sets the upper limit based on environmental parameters.

6. An apparatus according to claim 1, further comprising:
   a drive detector for detecting a movement of said moving member of said drive mechanism, wherein said controller controls said drive mechanism based on a signal from said drive detector.

7. A method for controlling a movement of a mobile apparatus, the method comprising step of:
   setting an upper limit on the number of corrective movement to move said mobile apparatus;
   moving said mobile apparatus to a target position;
   detecting a difference between an actual position of said mobile apparatus and the target position; and
   corrective moving said mobile apparatus within a range of said upper limit.

8. A method according to claim 7, wherein said detecting step senses the actual position by a gyroscopic sensor.

9. An method according to claim 7, wherein said setting step sets the upper limit based on environmental parameters.

10. A controller for a mobile unit comprising:
    a setting unit to set an upper limit on the number of corrective rotations to turn said mobile unit so as to correct the turning angle of said mobile unit; and
    a turning unit to turn said mobile unit within a range of a set number of corrective rotations to correct the turning angle after said mobile unit has turned.

11. A controller according to claim 10, further comprising:
    a gyroscopic sensor to detect the number of turns of said mobile unit, wherein said turning unit measures the turning angle error based on the turning angle detected by said gyroscopic sensor.

12. A controller according to claim 11, wherein said setting unit sets the upper limit of the number of corrective turns based on environmental parameters.

* * * * *